(12) United States Patent
Kubota

(10) Patent No.: US 6,283,241 B1
(45) Date of Patent: *Sep. 4, 2001

(54) REAR SUSPENSION FOR SNOWMOBILES

(75) Inventor: Takahiko Kubota, Iwata (JP)

(73) Assignee: Yamaha Hatsudoki Kabushiki Kaisha, Iwata (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/759,059

(22) Filed: Dec. 2, 1996

(30) Foreign Application Priority Data

Nov. 30, 1995  (JP) ..................... 7-312968

(51) Int. Cl.$^7$ ................................. B62M 27/02
(52) U.S. Cl. .................. 180/193; 180/9.54; 305/116; 305/128; 305/131
(58) Field of Search .................. 180/190, 193, 180/9.5, 9.52, 9.54; 305/127, 128, 131, 126, 116, 120

(56) References Cited

U.S. PATENT DOCUMENTS

| | | | | |
|---|---|---|---|---|
| 3,727,709 | * | 4/1973 | Newman | 180/193 |
| 3,773,126 | * | 11/1973 | Irvine | 305/24 |
| 3,788,412 | * | 1/1974 | Vincent | 305/25 |
| 3,856,099 | * | 12/1974 | Bowers | 180/193 |
| 3,944,005 | * | 3/1976 | Tomita | 180/193 |
| 4,462,480 | * | 7/1984 | Yasui et al. | 180/9.1 |
| 5,730,242 | * | 3/1998 | Furusawa | 180/193 |
| 5,860,486 | * | 1/1999 | Boivin et al. | 180/193 |

* cited by examiner

Primary Examiner—Anne Marie Boehler
(74) Attorney, Agent, or Firm—Ernest A. Beutler

(57) ABSTRACT

A number of embodiments of snowmobile suspensions for the drive belt of the snowmobile. The suspension includes a single cushioning unit that has its opposite ends loaded by a linkage system that is interposed between a guide rail and a frame of the snowmobile. At least one of these pivotal connections is adjustable, and the adjustment is provided in a manner so that it can be made without changing the effective length of the cushioning unit during adjustment. In addition, a number of the embodiments permit the adjustment to be made at one side of the snowmobile.

19 Claims, 13 Drawing Sheets

REAR SUSPENSION FOR SNOWMOBILES

BACKGROUND OF THE INVENTION

This invention relates to a snowmobile and more particularly to a rear or drive belt suspension system for snowmobiles.

As is well known, the drive belt of a snowmobile is normally suspended relative to the frame assembly by a suspension system that includes at least one shock absorber and spring arrangement. Frequently, the shock absorber and spring arrangement is adjustably mounted so that the damping characteristics could be varied to some extent to compensate for changes in loading and/or individual riding preferences.

Normally, the way this is accomplished is that one end of the shock absorber and spring arrangement has a connection to the frame assembly that is provided by an adjustable pivot pin. With this type of arrangement, the cushioning unit has an opening that receives a cross-bolt that spans the side rails of the frame and which permit adjustment of the position of the end of the cushioning unit relative to the side rail. Since there are a pair of side rails, one at each side of the drive belt, the connection at each side must be adjusted.

This means that an operator must place himself on one side of the snowmobile, detachably connect with one of the connections, move around to the other side and then detachably connect that connection, move it to a new location, and then lock it in place. The operator must then go back to the other side and finish the connection at that side. Obviously, this is a cumbersome operation. Furthermore, the connection is low in the area where the drive belt engages the ground and thus can frequently become encrusted with snow and ice.

Furthermore, this type of adjustment also requires adjustment to be made in such a manner that the weight of the snowmobile is not totally borne by the shock absorber and hence the operator must either load the shock absorber element, hold the body up, or both in order to complete the adjustment.

It is, therefore, a principal object of this invention to provide an improved arrangement for adjusting the suspension system of a drive belt of a snowmobile.

It is a further object of this invention to provide a drive belt suspension arrangement for a snowmobile that embodies a cushioning element and a connection in the loading mechanism that permits ease of adjustment and which does not require the operator to move from one side of the snowmobile to the other to effect the adjustment.

It is a further object of this invention to provide an improved adjustment mechanism for a snowmobile suspension wherein the adjustment may be made without the operator having to apply force to either compress or expend the cushioning unit when making the adjustment.

SUMMARY OF THE INVENTION

This invention relates to a snowmobile comprised of a frame assembly, a drive belt, an engine transmission assembly for driving the drive belt and a suspension system for suspending the drive belt for suspension movement relative to the frame assembly. The suspension system includes at least one guide rail that is associated with the backup side of the drive belt and which assists in maintaining the drive belt in driving contact with the terrain over which the vehicle travels. In addition, a cushioning unit is provided that has a pair of relatively movable end portions and which cushions the movement of the end portions relative to each other. The suspension system further includes a linkage assembly for suspending the guide rail for suspension movement relative to the frame assembly and for loading the cushioning unit by moving the two ends of the cushioning element relative to each other in opposite directions upon suspension movement. At least one of the connections of the linkage system is adjustable for adjusting the suspension characteristics of the cushioning unit.

DETAILED DESCRIPTION OF THE PREFERRED EMBODIMENTS OF THE INVENTION

Figure 1:
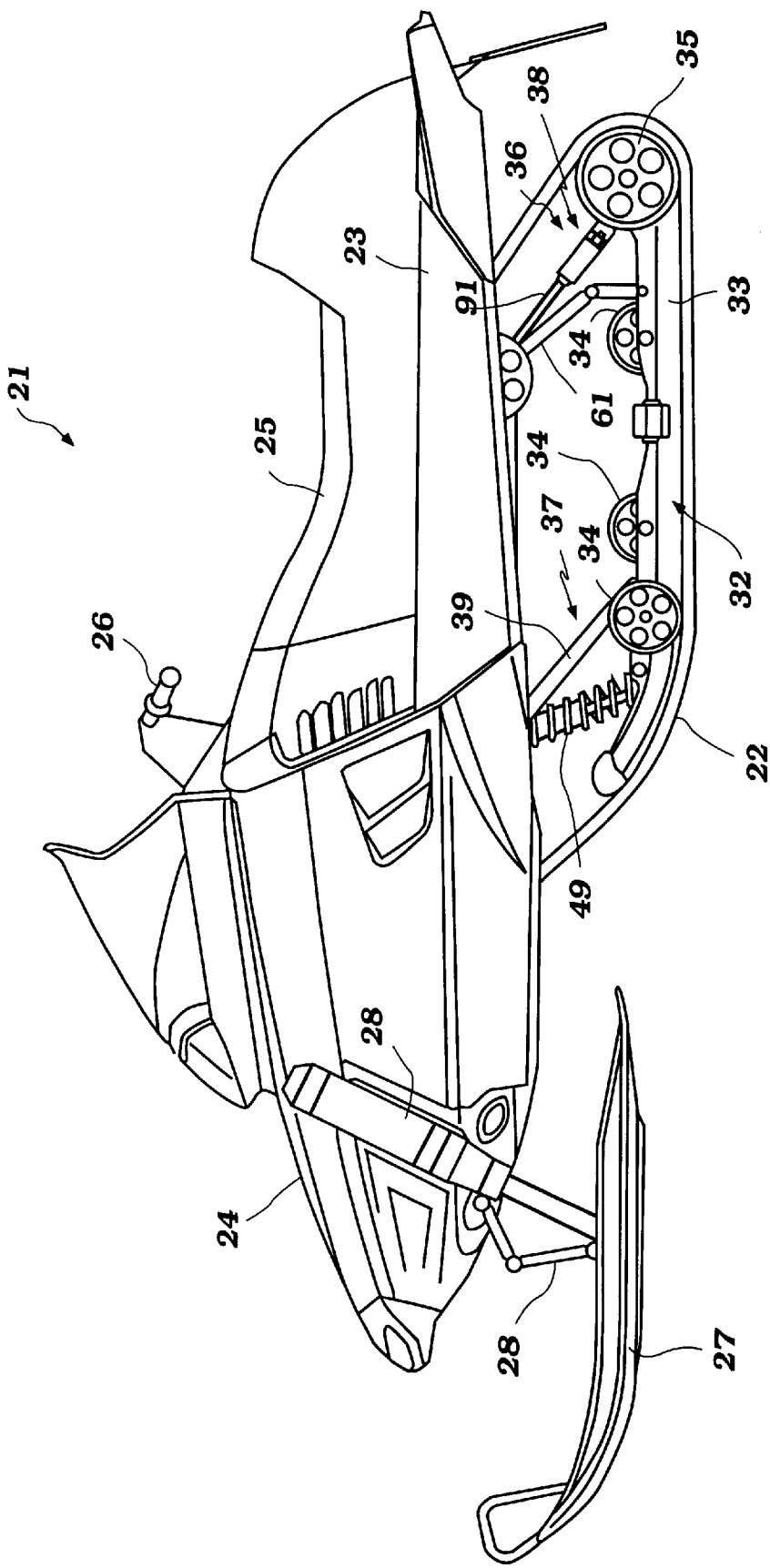
FIG. 1 is a side elevational view of a snowmobile constructed in accordance with a first embodiment of the invention, with the snowmobile shown in an unladen condition.

Referring now in detail to the drawings and initially to the embodiment of FIGS. 1–7 and initially primarily to FIG. 1, a snowmobile constructed in accordance with an embodiment of the invention is identified generally by the reference numeral 21. Since the invention deals primarily with the suspension for the drive belt, indicated generally by the reference numeral 22, the overall construction of the snowmobile 21 will be described only generally. Where any components of the snowmobile 21 are not described in detail or not illustrated, reference may be had to any known prior art construction for such missing details.

The snowmobile 21 includes a frame assembly, indicated generally by the reference numeral 23, which consists primarily of a pair of side frame members that are formed from sheet metal or the like. A body 24 covers the forward portion of the snowmobile and a major portion of the rear part thereof. A seat 25 is disposed behind a control handlebar assembly 26 for operation of the snowmobile 21 by a rider seated on the seat 25.

A pair of front skis 27 are journaled by respective ski suspension units 28 that include strut-type dampers 29. This front suspension permits steering movement of the front skis 27 in a known manner. This steering movement is controlled by the handlebar assembly 26.

Contained within the interior of the front portion of the body 24 is an internal combustion engine of any known type which drive a transmission. The transmission may be of the continuously variable type and can include a centrifugal clutch for driving the drive belt 22.

The drive belt 22 and its suspension system will now be described in more detail by reference additionally to FIGS. 2–7. As with the prior art type of construction, a driving sprocket assembly 31 is journaled upon the frame assembly 23 in a known manner and is driven through the aforenoted engine/transmission combination. The sprocket 31 is engaged with the backside of the drive belt 22 and drives it through a suitable and known type of cog mechanism.

A guide rail assembly, indicated generally by the reference numeral 32, comprised of a pair of spaced apart but interconnected guide rails 33 cooperates with and engages the backside of the drive belt 22. This guide rail assembly 32 journals a plurality of backup rollers 34 and a larger idler roller 35 mounted at the rear end of the guide rail assembly 22. The guide rail assembly 32 is supported for suspension movement relative to the frame assembly 23 by a suspension system, indicated generally by the reference numeral 36. This suspension assembly 36 includes a front suspension unit 37 and a rear suspension unit 38.

Figure 3:
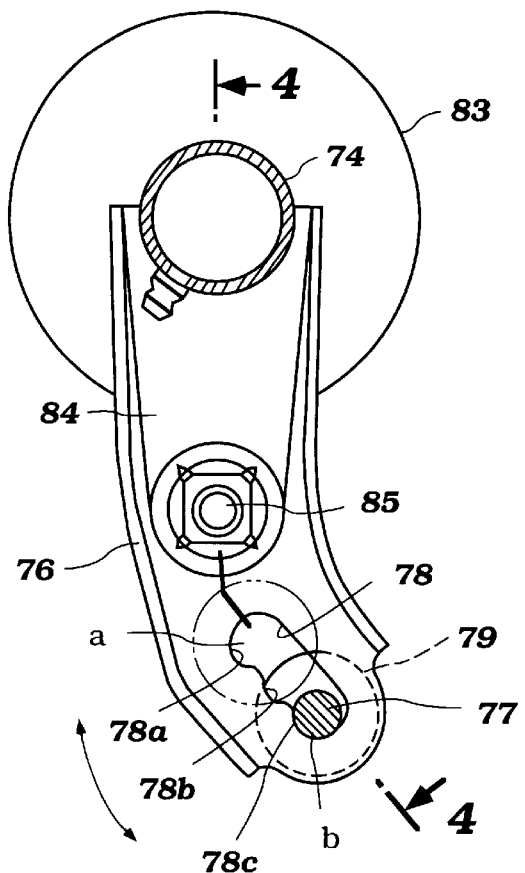
FIG. 3 is an enlarged view showing the adjusting mechanism of this embodiment.
Figure 4:
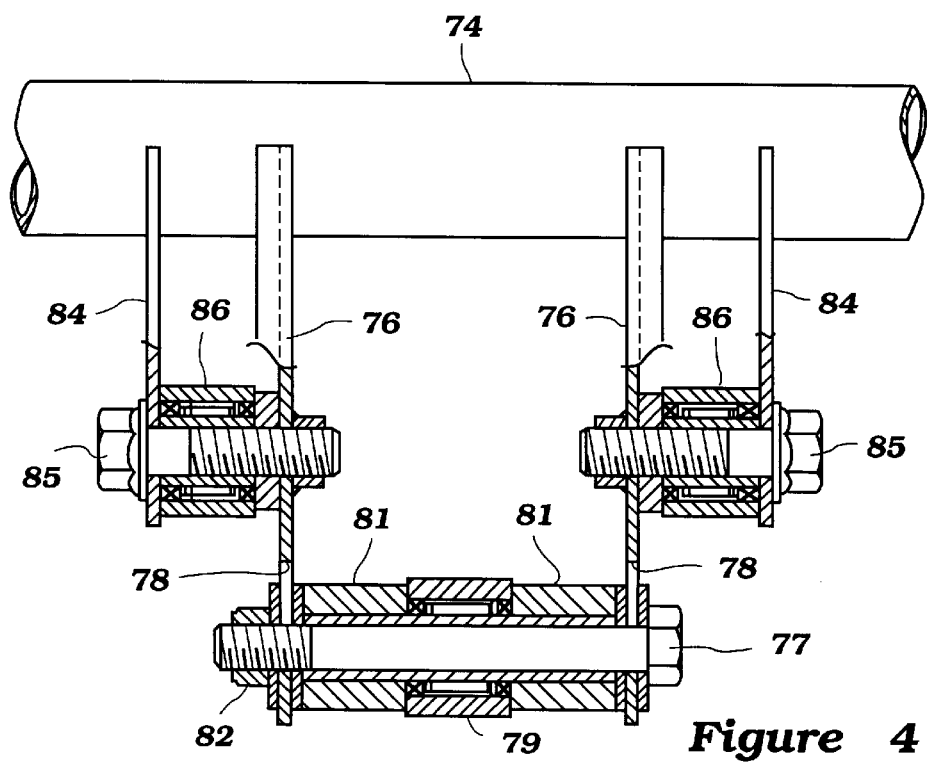
FIG. 4 is a cross-sectional view taken along the line 4—4 of FIG. 3, again showing the adjusting mechanism.
Figure 5:
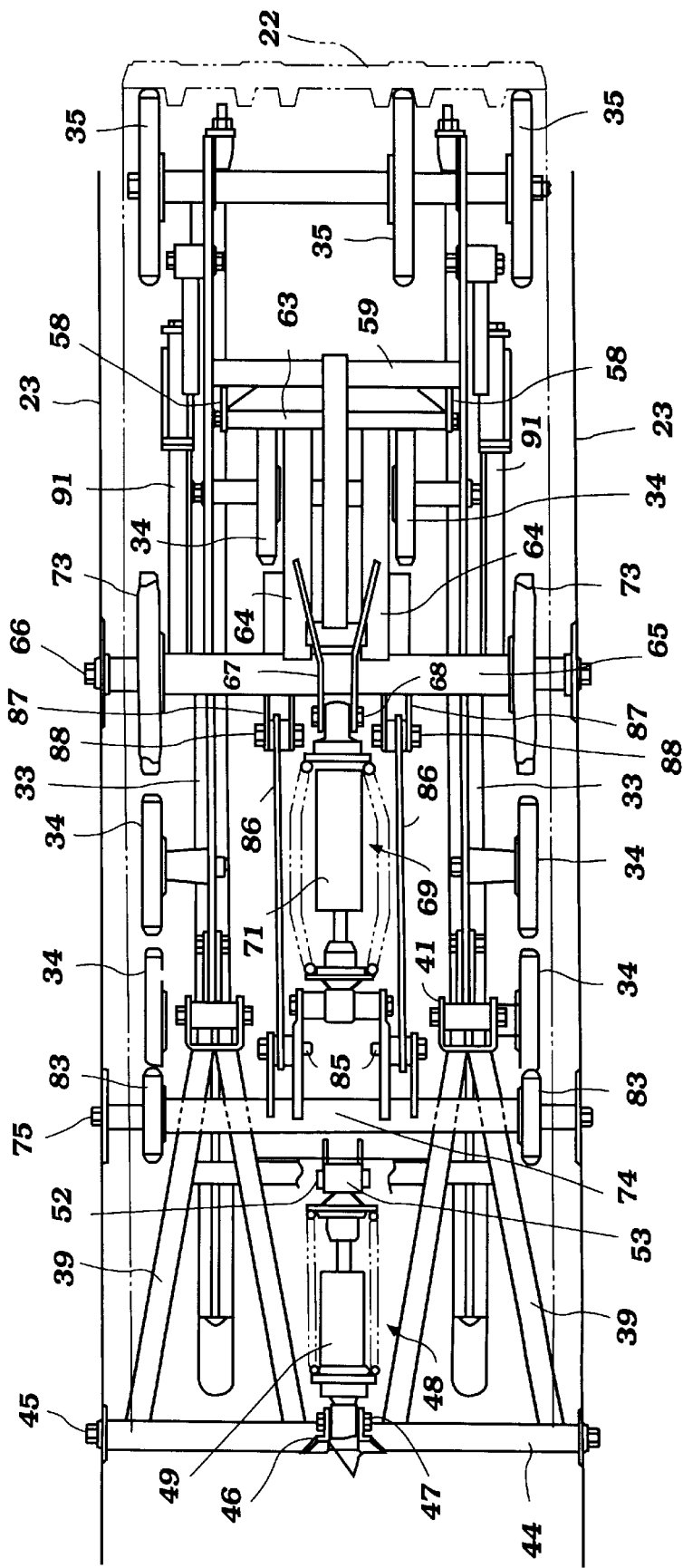
FIG. 5 is a top plan view of the drive belt suspension mechanism, with the drive belt being shown partially in phantom.

Referring now in detail primarily to FIGS. 2–5, the front suspension unit is comprised of a pair of lever arms 39 positioned at opposite sides of the guide rail assembly 32, and cooperating with brackets 41 formed on each of the side plates 33. These lever arms 39 are, as best seen in FIG. 5, of a triangular built-up configuration and carry trunions 42 at their lower ends, which are connected by pivot pins 43 to the respective brackets 41. The upper ends of these triangular lever arms 39 are connected, as by welding, to a cross-tube 44. This cross-tube 44 is, in turn, pivotally supported on the side rails of the frame assembly 23 by means of a pivot shaft 45.

A bracket 46 is affixed by welding to the tubular member 44 and provides a pivotal connection, as at 47, to one end of a combined spring and cushioning unit, indicated generally by the reference numeral 48. The cushioning unit 48 is comprised of a telescopic shock absorber 49 and a surrounding coil compression spring 51.

The lower end of this cushioning unit 48 is connected by means of a pivot pin 52 to a pair of brackets 53 which are, in turn, affixed to a further shaft 54 that is journaled on the forward portion of the guide rails 32. This shaft 54 is disposed forwardly of the pivot shaft 43.

Thus, when the forward portion of the drive track 22 engages an obstacle, the guide track 32 leading end will be forced upwardly. This upward movement will cause the lever arms 39 to pivot in a counterclockwise direction around the pivot shaft 45. This movement creates an upward force on the cushioning unit 48. At the same time, the upward movement of the pivot pin 52 will move the upper end of the cushioning unit 48 also upwardly. The relative movement is such, however, that there is an overall relative movement between the ends of the cushioning unit 48 which provides a resilient damping to the upward movement of the guide rail 32.

A drop-down control strap 55 is connected at one end to the shaft 54. The other end of this drop-down strap 55 is connected to an adjusting bracket 56 which is adjustable connected at 57 to the lever arms 39. This strap 55 will control how far the front of the guide rail 32 can drop down if the vehicle takes a jump, and also will limit the maximum extension of the cushioning unit 48. By attaching the strap 56 to the arms 39, it is possible to obtain a finer degree of adjustment with less overall movement than if the strap 56 were connected to the frame 23, as with prior construction. Also, the adjustment 57 is disposed where it is well above the level of the guide rail 32 and thus above the snow line.

Referring now to the rear suspension system 38, this includes a pair of links 58 which are connected to the ends of a tubular member 89 that spans the rail sides 33 and which is pivotally connected thereto by a pivot shaft 61. The upper ends of the links 58 are connected to a shaft 62 that is journaled in a tubular shaft 63. This tubular shaft 63 provides a pivotal connection to a pair of levers 64 that are affixed as by welding to it. The levers 64, in turn, extend upwardly and are affixed to a further tubular shaft 65. The tubular shaft 65 is journalled on the frame rails 23 by means of a pivot shaft 66.

A bell crank assembly 67 is affixed to the levers 64 and tubular shaft 65. This bell crank assembly 67 has a pivotal connection at 68 to one end of a second cushioning unit, indicated generally by the referenced numeral 69. The cushioning unit 69, like the cushioning unit 48, is comprised of a tubular shock absorber 71 and a surrounding coil compression spring 72. Hence, upon upward movement of the rearward portions of the guide rail 32 and rearward portion of the drive belt 22, the links 58 and 64 will effect rotation of the tubular shaft 65 and movement of the bell crank 67 so as to move the pivot pin 68 in an arc to load one end of the cushioning unit 69.

It should also be noted that the tubular member 65 also journals a further pair of idler rollers 73 which are engaged with the drive belt 22 and specifically the return flight side thereof.

The opposite end of the cushioning unit 69 is suspended from the frame assembly by a mechanism that is best shown in FIGS. 3 and 4. This mechanism includes a tubular member 74 that is journalled on the frame assembly 23 on a pivot shaft 75. A pair of inner lever arms 76 are affixed to the tubular member 74 and extend downwardly to receive a pivot bolt 77 in an arcuately-shaped slot 78 formed therein. The shape of the slot 78 serves a purpose which will be described later.

The cushioning unit 69 has a trunion portion 79 that is journalled on the pivot bolt 77 between the arms 76 by means of a pair of spacers 81. A lock nut 82 holds the pivot bolt 77 in its position. The tubular member 74 also journals a pair of idler rollers 83 which are engaged with the backside of the return flight of the drive belt 22.

Affixed to the tubular member 74 axially outwardly of the lever arm 76 is a second pair of lever arms 84 which are shorter in length than the lever arms 76. These shorter lever arms 84 are connected also to an intermediate portion of the lever arm 76 by means of bolts 85. The bolts 85 also provide a pivotal connection to one end of a respective tie link 86. The opposite ends of the tie links 86 are connected to a further arm portion 87 of the bell crank 67 by means of pivot pins 88.

As a result of this construction, when the guide rail 32 moves upwardly or downwardly, one end of the second cushioning unit 69 will be moved in a first direction and the opposite end will be moved in the opposite direction so as to magnify the degree of compression or expansion of the cushioning unit 69 in response to a given degree of suspension travel. This motion can be adjusted, in a manner which will be described later so as to vary the actual suspension characteristics. The slot 78 is configured so as to permit this adjustment.

The rear suspension unit 38 also includes a mechanism which functions so as to limit the maximum upward and downward movement of the rear portion of the track assembly 32. This mechanism is indicated generally by the reference numeral 89 and has a construction best shown in FIG. 6. The mechanism includes a pair of rod-like members 91 that extend upwardly and which are connected to the tubular member 65. The lower ends of these members 91 are slidably received in respective tubular bodies 92. The tubular bodies 92 are, in turn, carried by a semi-cylindrical member 93 which is connected to a tubular portion 94 which is, in turn, pivotally connected to brackets on the guide rails 33 by pivot pins 95.

Figure 6:
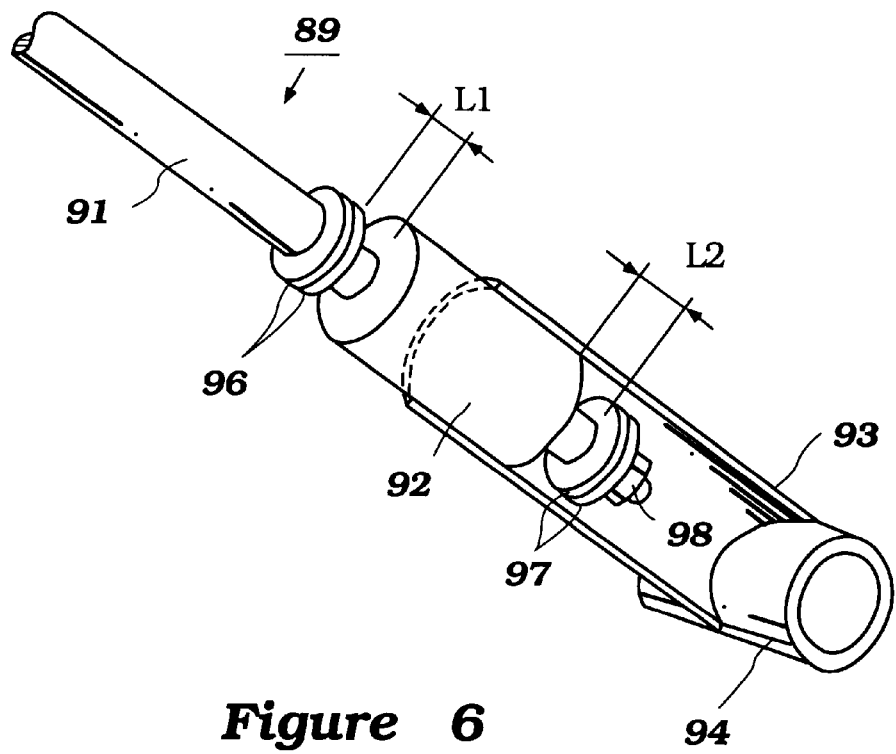
FIG. 6 is a perspective partially broken-away view, showing the limit stop adjustment for the rear portion of the suspension.

A stack of first adjusting shims 96 are disposed on one end of the rod 91 and engage one end of the tubular member 92 so as to limit the degree of compression or upward movement by setting the distance L1 as seen in FIG. 6. The maximum drop-down is controlled by a second series of shims 97 which engage the other end of the tubular member 92 so as to limit the maximum drop-down distance L2. A nut 98 permits the shims 96 and 97 to be affixed on the shaft rod 91 so as to adjust the distances L1 and L2 to suit rider preference.

Referring now to the adjusting mechanism for adjusting the suspension characteristics of the rear suspension unit 38, this may be understood best by reference to FIGS. 2, 3, 4, and 7. As may be seen in FIGS. 2 and 3, the slot 78 is arcuate and its center or radius is coincidence with the pivot pin 68. Hence, by loosening the nut 82 it is possible to move the pivot connection 77 to either of the points 78a, 78b, and 78c along the arc of the slot 78 so as to be fixed in either the position shown at a or b in FIG. 3. Also, an intermediate position is possible between the a and b positions.

Figure 7:
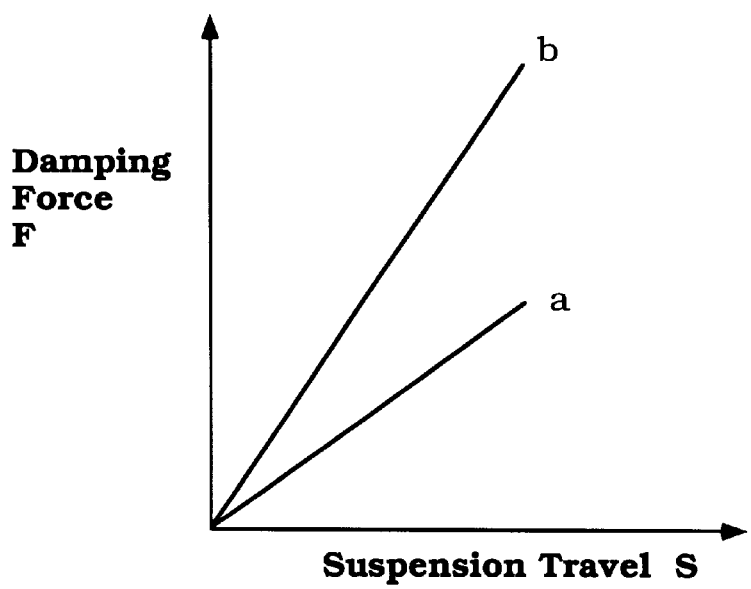
FIG. 7 is a graphical view showing the damping characteristics in two of the adjusted positions for this embodiment.

By changing the position of the pivot pin 77 in the slot 78, it is possible to adjust the length of the lever arm about the pivot pin which supports the tubular member 74 and thus change the effective linkage system. This changes the rate of damping force F in response to suspension travel S as seen in FIG. 7. The curve b having the shorter length and thus greater slope provides a greater damping force than the curve a. As a result, it is possible to change the suspension characteristics easily by this adjustment. Since the adjustment is at the upper portion of the guide track 32 and can be easily accessed through the side of the track 22 it may be made without difficulties even when operating in relatively deep snow. Also, since there is only one pivot bolt 77 and one nut 82, the adjustment may be made at only one side of the snowmobile and thus, simplify the type of adjustment possible over those of the prior art mechanism.

Figure 2:
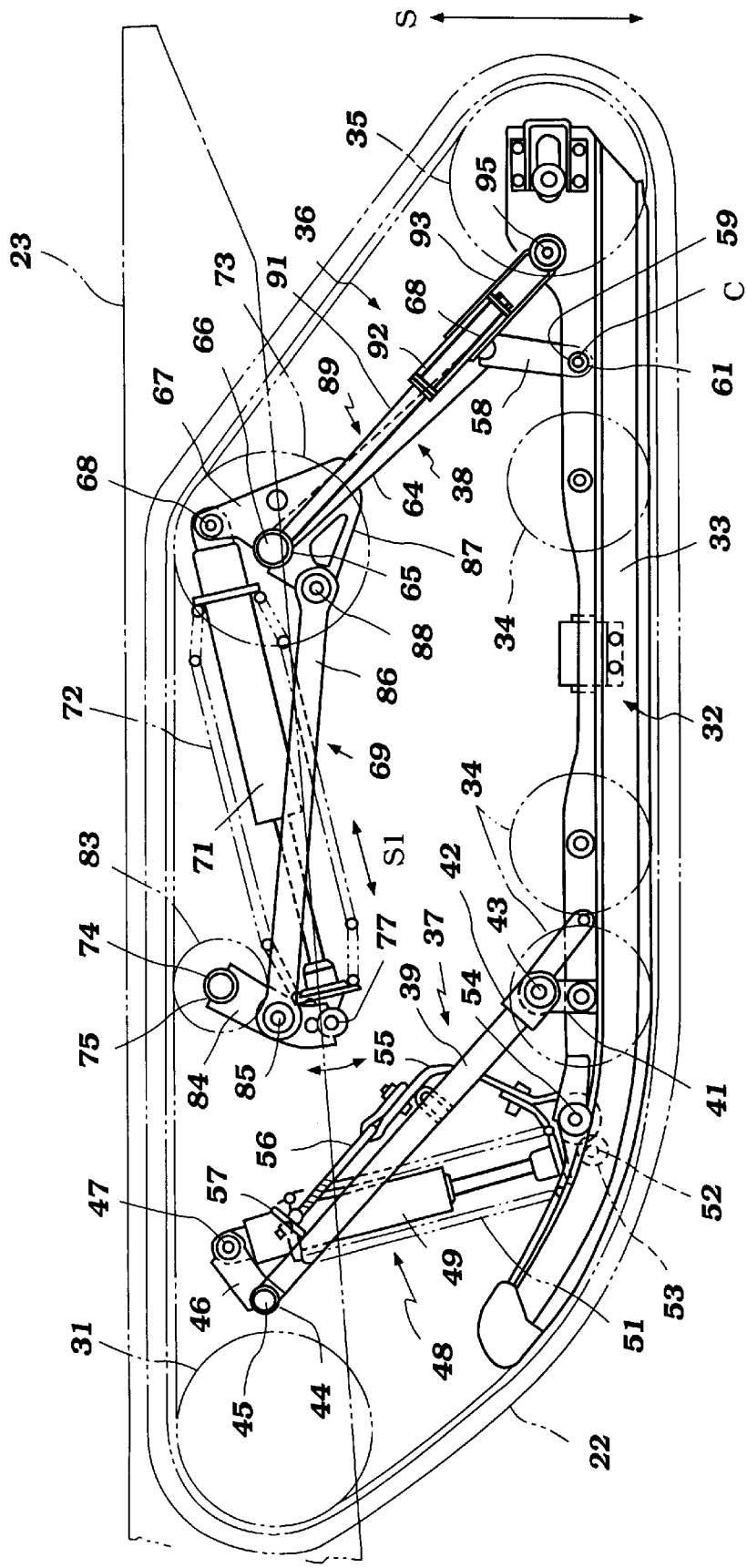
FIG. 2 is an enlarged side elevational view showing the suspension mechanism for the drive belt, with the drive belt and associated frame being shown in phantom.

Because of this adjustment, the stroke S1 of the cushioning unit 69 is changed for a given suspension travel S as seen by the arrows in FIG. 2. Thus, this offers a wide range of suspension settings. Furthermore, since center of the arc of the slot 78 is coincident with the pivot pin 68, this adjustment does not require the operator to either extend or compress the cushioning unit 69 during adjustment and hence, the cushioning unit 69 will not fight this adjustment.

It may be necessary during making these adjustments, at time, also to loosen the nut 97 on the control rods 91. After the adjustment has been made, the control rod 91 may again be locked in position by utilizing the nut 98 and the respective shims 96 and 97.

Figure 8:
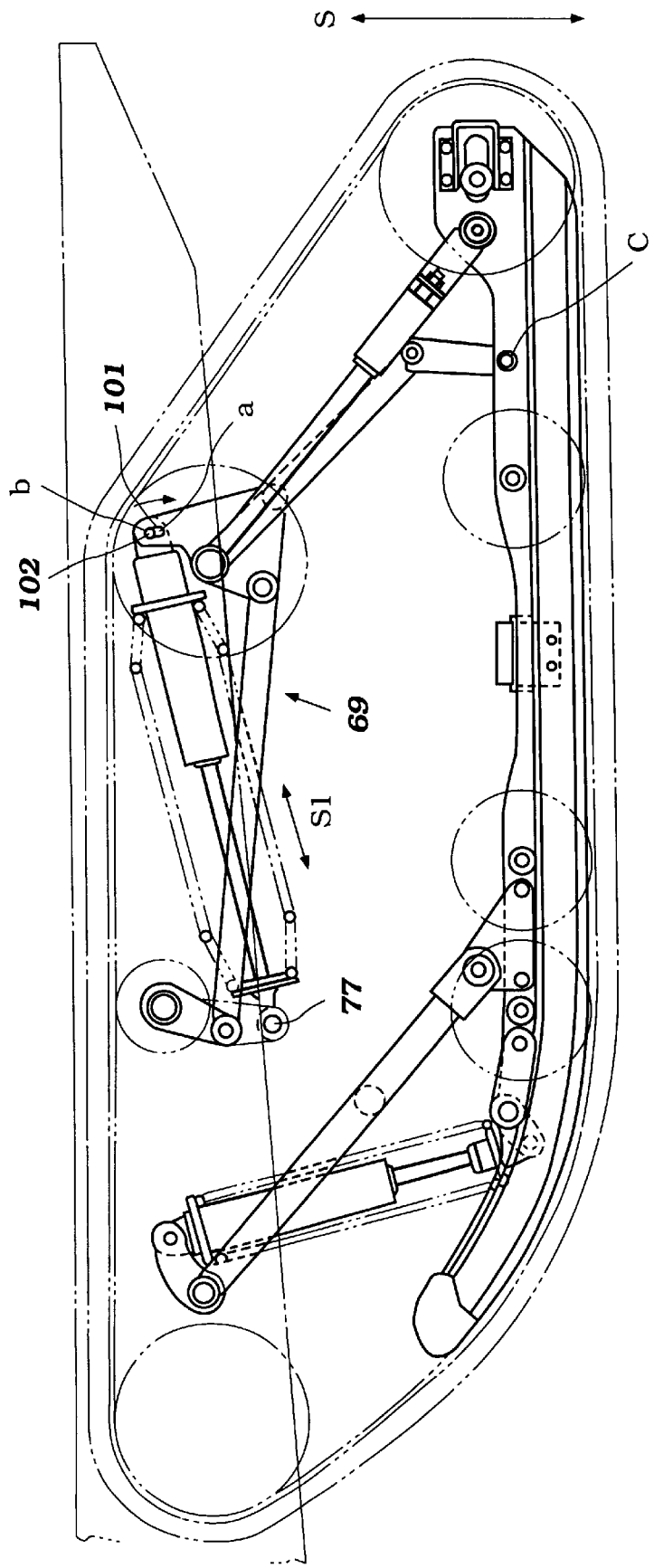
FIG. 8 is a side elevational view, in part similar to FIG. 2, and shows another embodiment of the invention.

FIG. 8 shows another embodiment of the invention which is substantially the same as the embodiment of FIGS. 1–7. This embodiment differs from the previous embodiment only in the way in which the adjustment of the cushioning unit 69 is made. In this embodiment, rather than the connection to the lever arm 76 being adjustable, the pivotal connection at the bell crank 67 is adjustable. Since this is the only difference from the previous embodiment, all components of this embodiment except for those dealing with the pivotal adjustment have been identified by the same reference numerals and will not be described again.

In this embodiment, an arcuate slot 101 is formed in the bell crank arm 67. A single locking bolt and nut assembly 102 is passed through the slot 101 and it is received in one of three arcuate positions a, b, and an unnumbered intermediate position shown in FIG. 8. The arc of the slot 101 is drawn around the pivot point 77 of the cushioning unit 69 and, therefore, adjustment can again be made without requiring compression or extension of the cushioning unit 69. Thus, this unit also can provide damping curves as shown in FIG. 7 and the adjustment can be made as simply as that previously described. Since in all other regards this embodiment is the same as that previously described, further description of this embodiment is not believed to be necessary to permit those skilled in the art to practice the invention.

Figure 9:
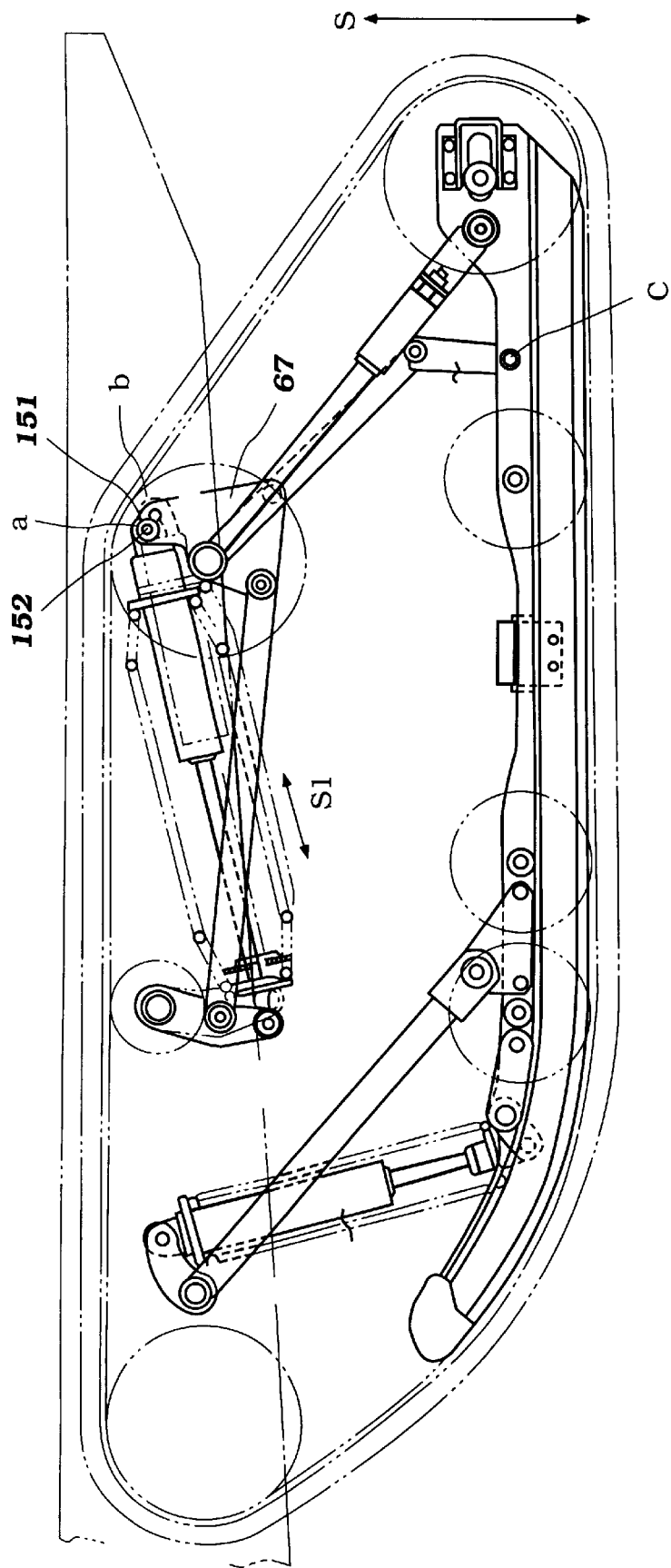
FIG. 9 is a side elevational view, in part similar to FIGS. 2 and 8, and shows a third embodiment of the invention.

In the two embodiments thus far described, the adjustment of the linkage system for loading the cushioning unit 69 has been such that the initial loading point of the cushioning unit 69 relative to the suspension travel has not been changed. Rather, with these embodiments the leverage adjustment or amount of movement of the cushioning unit relative to suspension movement has been adjusted. Next will be described an embodiment, shown in FIGS. 9 and 10, wherein the actual point at which the cushioning unit 69 becomes compressed will be changed for a given suspension travel. This has the effect of permitting a change in the rate of damping.

Figure 10:
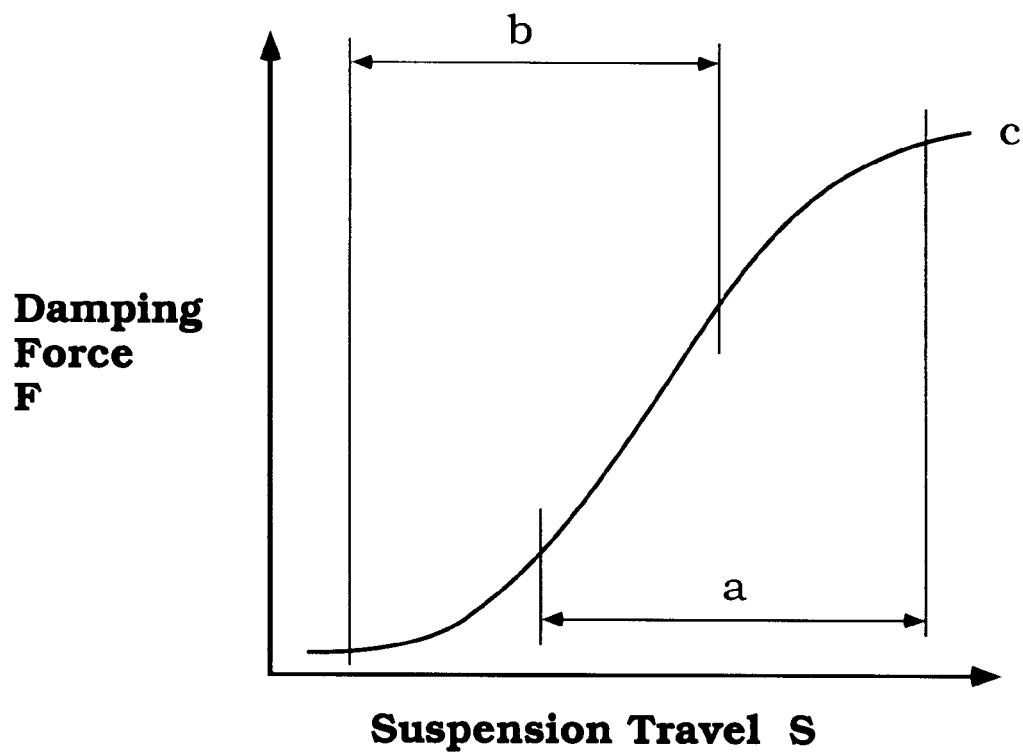
FIG. 10 is a graphical view showing how the damping characteristics of the embodiment of FIG. 9 vary with the adjustment.
Figure 11:
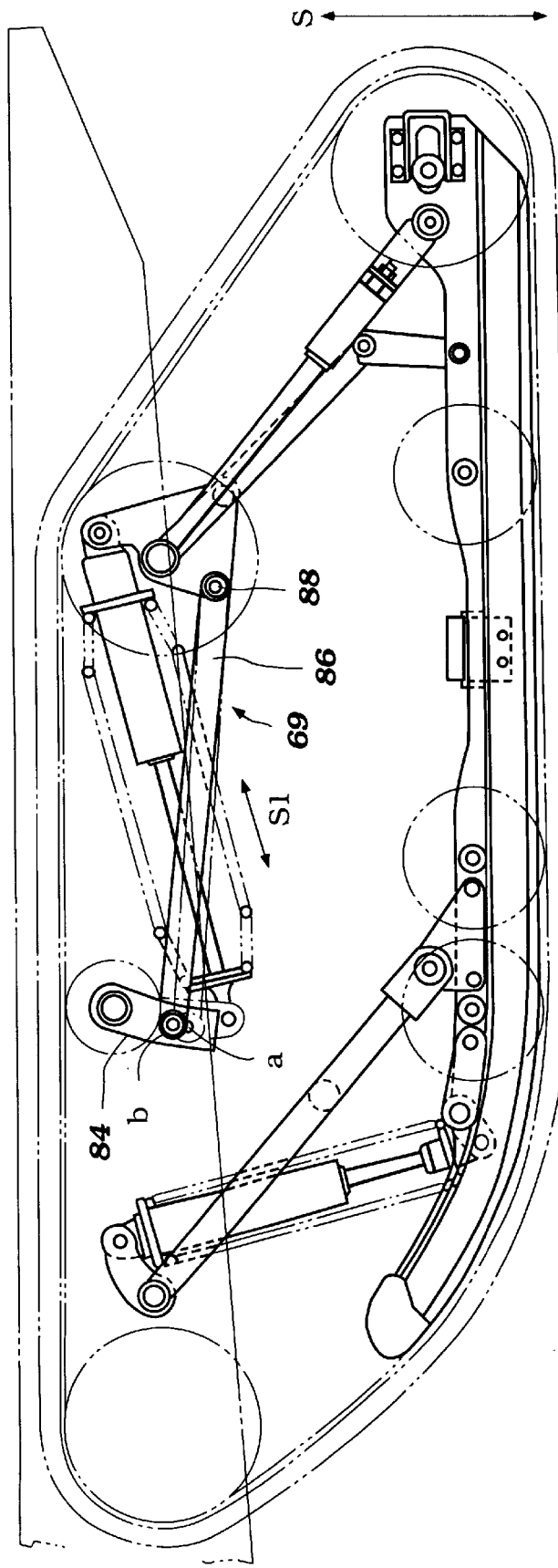
FIG. 11 is a side elevational view, in part similar to FIGS. 2, 8 and 9, and shows fourth embodiment of the invention.

As seen in FIG. 10, which shows the full range of damping of the cushioning unit for the suspension travel the operation is relatively linear through the major portion of the stroke of the cushioning unit 69. The ends of the travel, however, have a more arcuate configuration. Thus, by shifting the point at which the cushioning unit becomes loaded it is possible to obtain not only a change in rate but a change in damping characteristics.

This is accomplished in this embodiment by forming the bell crank 67 with an arcuate slot 151 to receive a pivot bolt 152 at the end of the cushioning unit 69. Except for this difference, this embodiment is the same as those previously described and therefore components which are the same or substantially the same have been identified by the same reference numerals and will not be described again, except insofar as is necessary to understand the construction and operation of this embodiment.

In this embodiment the arc of the slot 151 is drawn about a radius that is coincident with the center of the pivot shaft 66. Hence, by loosening the nut of the locking bolt 152, it is possible to rotate the bell crank 67 relative to the cushioning unit cushioning unit 69 so as to accomplish the adjustment This, in effect, changes the point at which the suspension travel will begin to effect movement of the cushioning unit 69 from its steady state or at-rest position. Hence, the adjustment may be made without requiring compression or extension of the cushioning unit 69, as was also true in the previous embodiments. Thus, if the pivot bolt 152 is placed at the slot end b then the cushioning unit will be loaded early upon suspension travel and the damping curve b appearing in FIG. 10 will resolve.

However, by moving the pivot bolt to the other end a of the slot 151, the damping of the shock absorber will occur at the other end of its stroke and hence, will be a stiffer suspension particularly during initial suspension travel with the damping falling off at the end of the suspension travel. Thus, this embodiment offers a somewhat greater latitude in the type of ride control that is possible. In all other regards, this embodiment operates the same as those previously described and has all of the same advantages thereof.

FIGS. 11–14 show still a further embodiment of the invention which is basically the same as those embodiments already described. Therefore, only the difference between this embodiment and the previous embodiments will be described and where components are the same or substantially the same as those previously described, they have been identified by the same reference numerals.

Figure 12:
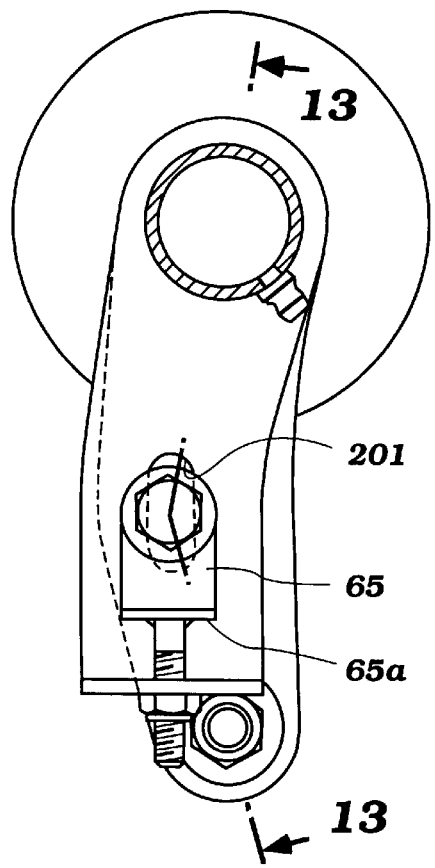
FIG. 12 is an enlarged side elevational view of the adjusting mechanism of the embodiment of FIG. 11.
Figure 13:
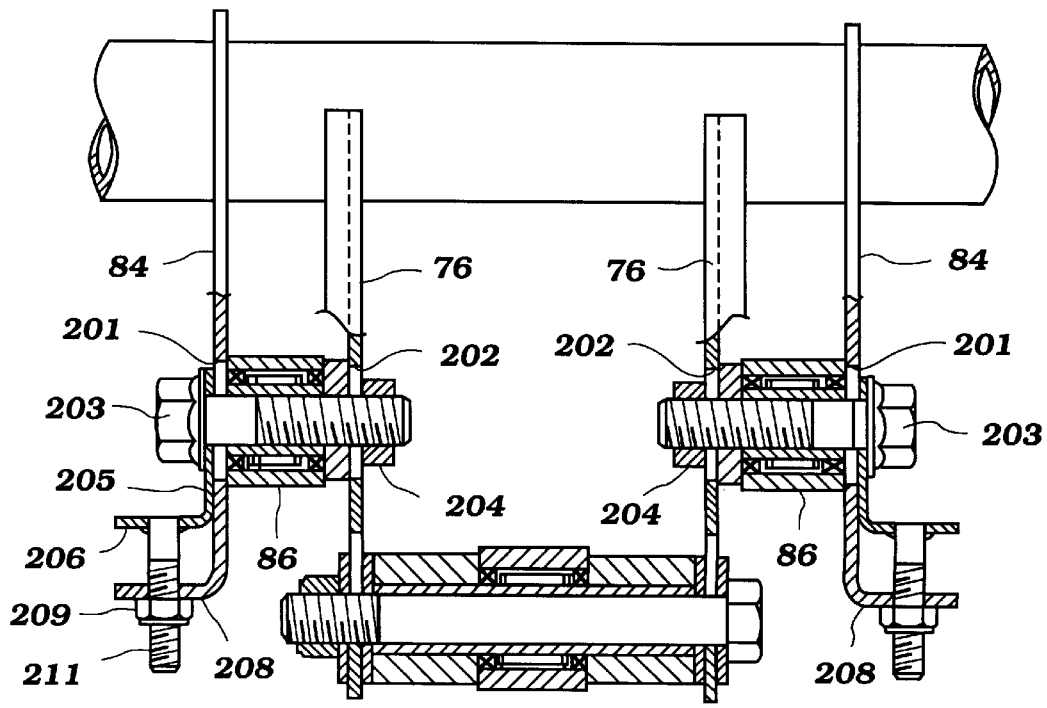
FIG. 13 is a cross-sectional view, taken along the line 13—13 of FIG. 12.

In this embodiment, the pivotal adjustment for adjusting the effect of the cushioning unit 69 is placed between the tie bars 86 and their respective lever arms 84. Therefore, the lever arms 84 are provided with arcuate slots 201 as best seen in FIGS. 12 and 13. These arcuate slots have their radius coincident with the pivot pin 88 at the opposite end of the tie links 86. Like shaped slots 202 are also formed in the lever arms 76. The pivot bolts 203 pass through these slots 201 and 202 are locked in place by nuts 204.

In addition, the side of the bolts 203 adjacent the outer side of the lever arm 84 are trapped in the vertical leg 205 of a bracket assembly 206. This bracket assembly 206 has a threaded member 207 that depends through an interned arm 208 formed at the lower end of the lever arms 84. A lock nut 211 adjust the position of the bracket 206 and accordingly, the position of the pivot bolts 203 in the slots 201 and 202. This adjustment may be made by loosening the nuts 204 by turning the bolts 203.

Figure 14:
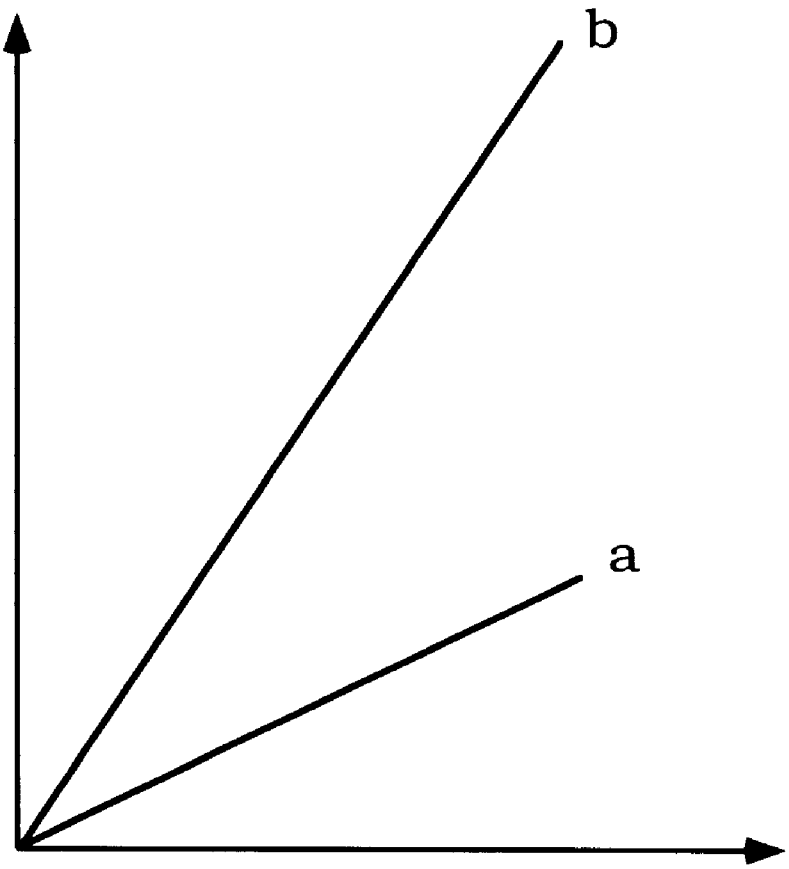
FIG. 14 is a graphical view showing how the damping characteristics of this embodiment vary with the adjustment.

In view of the fact that the lever arms 84 are shorter in length than the lever arms 76, the adjustment of the axial position of the pivotal connections 203 along the lever arm 84 has a greater effect on the change in slope of the damping curves as shown in FIG. 14. That is, the slope change of the curves indicated at a and b representing the two extreme positions is substantially greater than the differences provided by the embodiment of FIGS. 1–7 as shown in FIG. 7. Otherwise, this embodiment has the same advantages as hose previously described and, therefore, further discussion and description of this embodiment is not believed to be necessary to permit those skilled in the art to understand and practice the invention.

Figure 15:
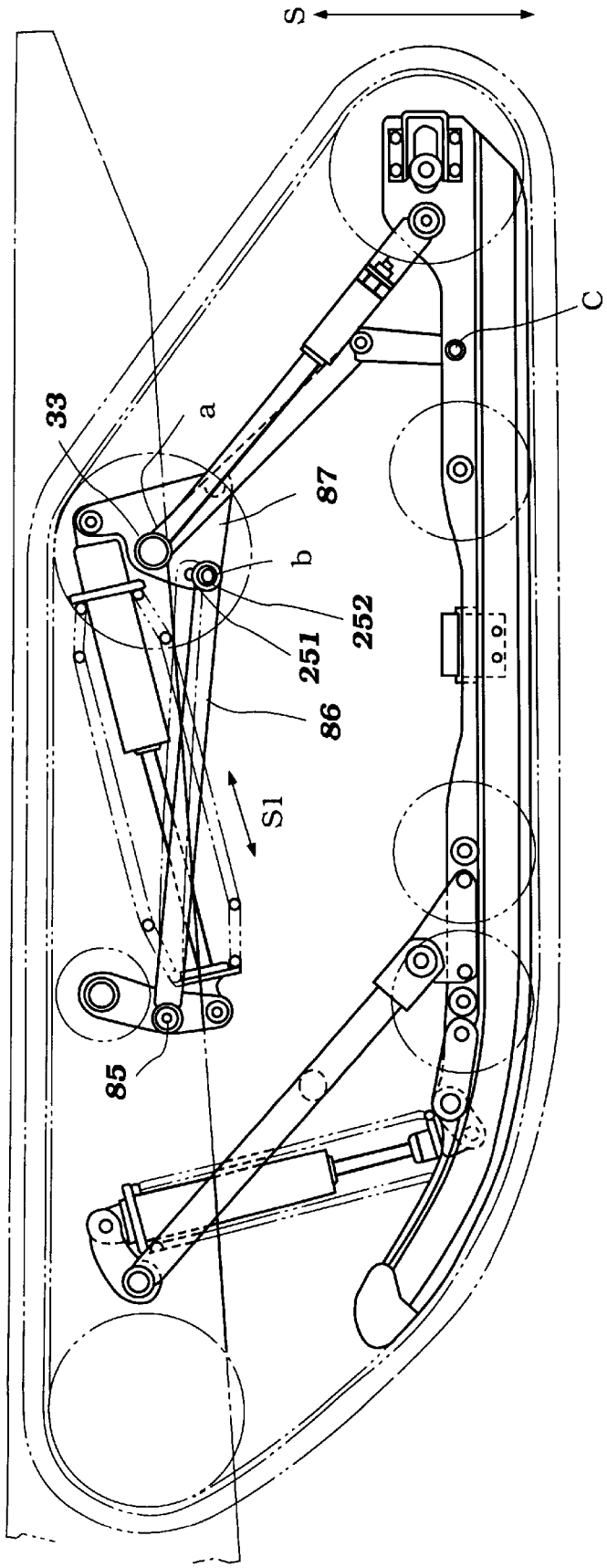
FIG. 15 is a side elevational view, in part similar to FIGS. 2, 8, 9 and 11, and shows a fifth embodiment of the invention.

FIG. 15 illustrates another embodiment of the invention wherein the adjustment is made in the pivotal connection of the tie bars 86. In this embodiment, however, the adjustment is made at the end opposite from that shown in FIGS. 11–14. Because this is the only difference from that embodiment, components of this embodiment which are the same as those previously described have again been identified by the same reference numerals and will be described again only insofar as is necessary to understand the construction and operation of this embodiment.

In this embodiment, the bell crank arm 87 is provided with an arcuate slot 251 that receives a pivot bolt and locking assembly 252. The arc of the slot 251 has its radius at the pivot point 85 and hence, adjustment can be made without changing the loading of the cushioning unit 69 as with many of the previously described embodiments. Also, this embodiment has a damping curve as shown in FIG. 14 depending upon the adjusted position.

Figure 16:
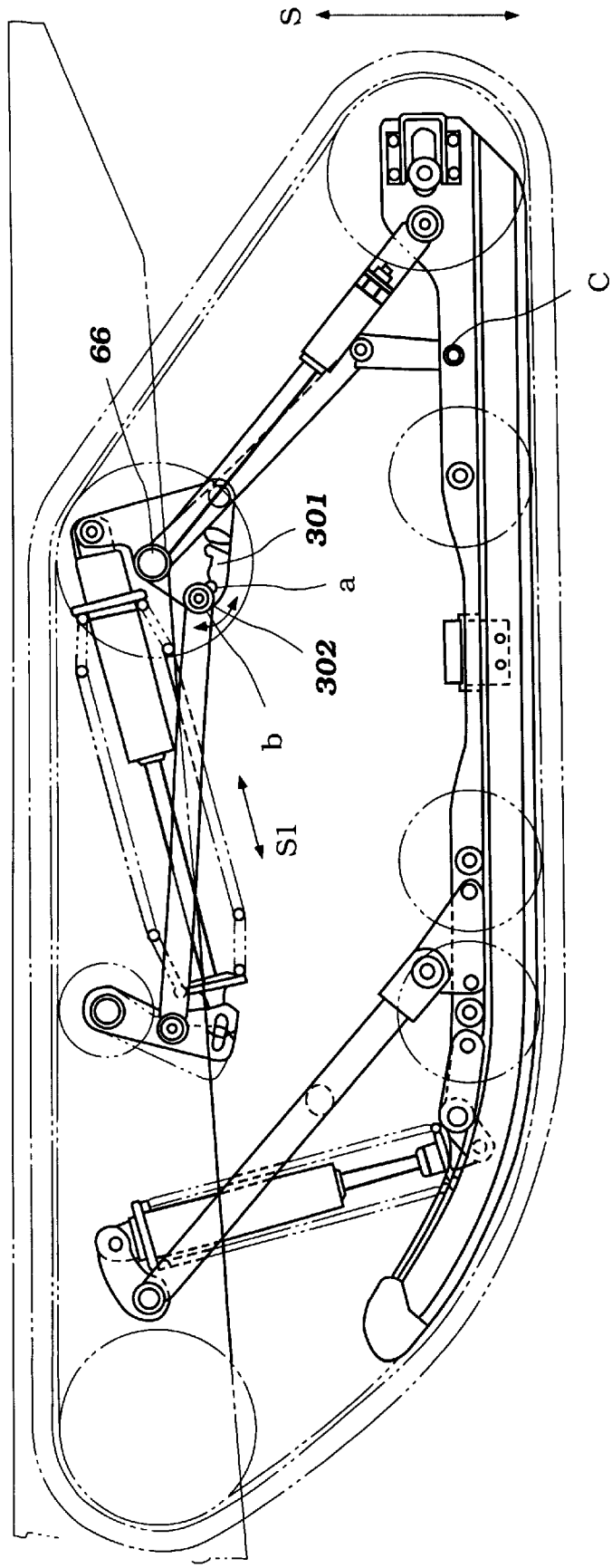
FIG. 16 is a side elevational view, in part similar to FIGS. 2, 8, 9, 11 and 15, and shows a sixth embodiment of the invention.

FIG. 16 shows the final embodiment and this embodiment differs from the embodiments of FIGS. 11–14 and FIG. 15 in the configuration of the pivotal connection at one end of the tie rods 86. In this embodiment, the pivotal connection is provided by a slot 301 that is formed in the bell crank arm 87. This slot 301 has an arcuate configuration with its center being located at the pivot point 66 and thus, is like the embodiment of FIG. 9 in its damping characteristics and provides a damping curve of the type as shown in FIG. 10. Because of this construction, a locking nut 302 provides the adjustment mechanism in this embodiment and because of its similarity to those previously described, further description of this embodiment is not believed necessary to permit those skilled in the art to practice the invention.

Thus, from the foregoing description it should be readily apparent that each of the embodiments permits ease of adjustment of the suspension characteristics of the drive belt suspension for the snowmobile. This adjustment is made at a location which is spaced above the ground surface and above the ground contact portion of the drive belt so that it can be made without encumbrance from snow. In addition, in most embodiments, the adjustment can be made at only one side of the snowmobile. Furthermore, in all embodiments, the adjustment is made in such a way that the loading of the cushioning unit is not changed while the adjustment is being made, and hence, adjustment is facilitated.

Of course, the foregoing description is that of preferred embodiments of the invention, and various changes and modifications may be made without departing from the spirit and scope of the invention, as defined by the appended claims.

What is claimed is:

1. A snowmobile comprised of a frame assembly, a drive belt having a ground engaging side and a backed-up side, an engine transmission assembly for driving said drive belt, and a suspension system for suspending said drive belt for suspension movement relative to said frame, said suspension system including at least one guide rail associated with the backed-up side of said drive belt for maintaining said drive belt in driving contact with the terrain over which said snowmobile travels, a cushioning unit having a pair of relatively movable end portions and which cushions the movement of the end portions relative to each other, a linkage assembly having only a connection to said guide rail at a single location along its length and being comprised of links having connections for suspending said guide rail for suspension movement relative to said frame assembly and for loading said cushioning unit by moving each of said end portions of said cushioning unit relative to each other in opposite directions upon suspension movement, at least one of said connections of said linkage assembly being adjustable for adjusting the suspension characteristics of said cushioning unit without changing the relative positions of the ends of the cushioning unit during the adjustment.

2. A snowmobile as set forth in claim 1, wherein the adjustment is made at one end of said connecting link.

3. A snowmobile as set forth in claim 1, wherein the adjustment is provided at one end of a pivoted lever.

4. A snowmobile as set forth in claim 3, wherein the lever is pivotally mounted on the frame at a point spaced from the adjustable pivotal connection.

5. A snowmobile as set forth in claim 4, wherein the adjustable pivotal connection is provided by an arcuate slot having its radius at the pivotal support of the lever.

6. A snowmobile as set forth in claim 1, wherein the adjustable connection is spaced vertically above the lowermost ground engaging surface of the drive belt.

7. A snowmobile comprised of a frame assembly, a drive belt having a ground engaging side and a backed-up side, an engine transmission assembly for driving said drive belt, and a suspension system for suspending said drive belt for suspension movement relative to said frame, said suspension system including at least one guide rail associated with the backed-up side of said drive belt for maintaining said drive belt in driving contact with the terrain over which said snowmobile travels, a cushioning unit having a pair of relatively movable end portions and which cushions the movement of the end portions relative to each other, a linkage assembly comprised of links having connections for suspending said guide rail for suspension movement relative to said frame assembly and for loading said cushioning unit by moving the two ends of said cushioning unit relative to each other in opposite directions upon suspension movement, at least one of the connections of said linkage assembly being provided at one end of one of said links being adjustable for adjusting the suspension characteristics of said cushioning unit without changing the relative positions of the ends of the cushioning unit during such adjustment, such adjustment being provided by a slotted connection at the one end of said one link, the radius of said slot being coincident with a pivotal connection at the other end of said one link.

8. A snowmobile comprised of a frame assembly, a drive belt having a ground engaging side and a backed-up side, an engine transmission assembly for driving said drive belt, and a suspension system for suspending said drive belt for suspension movement relative to said frame assembly, said suspension system including at least one guide rail associated with the backed-up side of said drive belt for maintaining said drive belt in driving contact with the terrain over which said snowmobile travels, a telescopic cushioning unit having a pair of relatively movable end portions and which cushions the movement of the end portions relative to each other, and a linkage assembly comprised of links having connections for suspending said guide rail for suspension movement relative to said frame assembly and for loading said cushioning unit by moving said end portions of said cushioning unit relative to each other in opposite directions upon suspension movement, at least one of the connections of said linkage assembly being adjustable for adjusting the suspension characteristics of said cushioning unit without changing the relative positions of the ends of the cushioning unit during the adjustment, said linkage system including a bell crank having a first pivotal connection to said frame and a second pivotal connection spaced from said first pivotal connection to one of said cushioning unit end portions, a lever pivotally supported on said frame and having a third pivotal connection to the other end portion of said cushioning unit, and a tie bar having a fourth pivotal connection to said bell crank and a fifth pivotal connection to said lever, said second and fourth pivotal connections lying on the opposite sides of said first pivotal connection.

9. A snowmobile as set forth in claim 8, wherein the adjustment is made at the third pivotal connection.

10. A snowmobile as set forth in claim 9, wherein the adjustment is provided by a slotted connection at the one end of the lever and the radius of the slot is coincident with the pivotal connection at the other end of cushioning unit.

11. A snowmobile as set forth in claim 8, wherein the adjustment is made at the fifth pivotal connection.

12. A snowmobile as set forth in claim 11, wherein the adjustment is provided by a slotted connection to the lever and the radius of the slot is coincident with the pivotal connection of the lever to the frame.

13. A snowmobile as set forth in claim 8, wherein the adjustment is made at one end of the lever.

14. A snowmobile as set forth in claim 8, wherein the adjustment is made at one end of the lever bar.

15. A snowmobile as set forth in claim 14, wherein the adjustment is provided at the end of the tie bar that forms the fourth pivotal connection.

16. A snowmobile as set forth in claim 14, wherein the adjustment is provided at the end of the tie bar that forms the fifth pivotal connection.

17. A snowmobile as set forth in claim 9, wherein the adjustment is made at the bell crank.

18. A snowmobile as set forth in claim 16, wherein the adjustment is made at the second pivotal connection.

19. A snowmobile as set forth in claim 18, wherein the adjustment is made at the fourth pivotal connection.

* * * * *